US010477828B2

(12) United States Patent
Hofman et al.

(10) Patent No.: US 10,477,828 B2
(45) Date of Patent: *Nov. 19, 2019

(54) AUTOMATED SYSTEM FOR APPLYING DISINFECTANT TO THE TEATS OF DAIRY LIVESTOCK

(71) Applicant: Technologies Holdings Corp., Houston, TX (US)

(72) Inventors: Henk Hofman, Lemmer (NL); Peter Willem van der Sluis, IJsselmuiden (NL); Ype Groensma, Heerenveen (NL)

(73) Assignee: Technologies Holdings Corp., Houston, TX (US)

( * ) Notice: Subject to any disclaimer, the term of this patent is extended or adjusted under 35 U.S.C. 154(b) by 287 days.

This patent is subject to a terminal disclaimer.

(21) Appl. No.: 15/637,247

(22) Filed: Jun. 29, 2017

(65) Prior Publication Data

US 2017/0295745 A1 Oct. 19, 2017

Related U.S. Application Data

(60) Continuation of application No. 15/177,375, filed on Jun. 9, 2016, now Pat. No. 9,737,043, which is a (Continued)

(51) Int. Cl.
*A01J 7/04* (2006.01)
*A01K 13/00* (2006.01)
(Continued)

(52) U.S. Cl.
CPC ............ *A01J 7/04* (2013.01); *A01J 5/003* (2013.01); *A01J 5/007* (2013.01); *A01J 5/0175* (2013.01);
(Continued)

(58) Field of Classification Search
CPC .................. A01J 7/04; A01K 13/001
(Continued)

(56) References Cited

U.S. PATENT DOCUMENTS 2,731,300 A 1/1956 Jansen ............ 299/111
2,830,559 A 4/1958 McMurray ......... 119/159
(Continued)

FOREIGN PATENT DOCUMENTS

AT 386 922 B 11/1988 ............ A01J 7/00
AT 387 686 B 2/1989 ............ A01J 5/01
(Continued)

OTHER PUBLICATIONS

Canadian Intellectual Property Office; Office Action for Application No. 2,783,887; 2 pages, dated Oct. 1, 2012.
(Continued)

*Primary Examiner* — David J Parsley
(74) *Attorney, Agent, or Firm* — Baker Botts L.L.P.

(57) ABSTRACT

A method for applying disinfectant to the teats of a dairy livestock comprises moving a robotic arm along a track in relation to a rotary milking platform housing a dairy livestock and independent of any physical coupling between the robotic arm and the rotary milking platform. The rotary milking platform has a substantially circular perimeter. The track is positioned outside the perimeter of the rotary milking platform. At least a portion of the track is straight and offset in relation to the rotary milking platform. The robotic arm comprises an arm member operable to pivot about an axis that is parallel to the track, and a spray tool attached to one end of the arm member. The method further comprises extending the robotic arm between the hind legs of the dairy livestock while the rotary milking platform
(Continued)

rotates such that the spray tool is located at a spray position from which it may discharge disinfectant to the teats of the dairy livestock.

20 Claims, 5 Drawing Sheets

Related U.S. Application Data continuation of application No. 14/260,585, filed on Apr. 24, 2014, now Pat. No. 9,433,184, which is a division of application No. 13/095,963, filed on Apr. 28, 2011, now Pat. No. 8,707,905.

(60) Provisional application No. 61/378,871, filed on Aug. 31, 2010.

(51) Int. Cl.

| | | |
|---|---|---|
| *B25J 9/16* | (2006.01) | |
| *A01K 29/00* | (2006.01) | |
| *A01J 5/003* | (2006.01) | |
| *A01J 5/007* | (2006.01) | |
| *A01J 5/017* | (2006.01) | |
| *A01K 1/12* | (2006.01) | |
| *G06T 1/00* | (2006.01) | |
| *G06T 7/73* | (2017.01) | |
| *A01J 7/00* | (2006.01) | |
| *B25J 11/00* | (2006.01) | |
| *G06T 7/00* | (2017.01) | |
| *G06T 7/13* | (2017.01) | |
| *B25J 9/00* | (2006.01) | |
| *H04N 7/18* | (2006.01) | |
| *G05B 19/042* | (2006.01) | |

(52) U.S. Cl.
CPC ............... *A01J 7/00* (2013.01); *A01K 1/126* (2013.01); *A01K 13/001* (2013.01); *A01K 29/00* (2013.01); *B25J 9/0027* (2013.01); *B25J 9/0093* (2013.01); *B25J 9/0096* (2013.01); *B25J 9/1679* (2013.01); *B25J 9/1684* (2013.01); *B25J 9/1697* (2013.01); *B25J 11/0045* (2013.01); *G05B 19/042* (2013.01); *G06T 1/0014* (2013.01); *G06T 7/0004* (2013.01); *G06T 7/13* (2017.01); *G06T 7/73* (2017.01); *H04N 7/183* (2013.01); *G05B 2219/2661* (2013.01); *G05B 2219/45113* (2013.01); *G06T 7/74* (2017.01); *G06T 2200/04* (2013.01); *G06T 2207/10004* (2013.01); *G06T 2207/10021* (2013.01); *G06T 2207/10028* (2013.01); *Y10S 901/02* (2013.01); *Y10S 901/06* (2013.01); *Y10S 901/07* (2013.01); *Y10S 901/09* (2013.01); *Y10S 901/41* (2013.01); *Y10S 901/43* (2013.01); *Y10S 901/47* (2013.01)

(58) Field of Classification Search
USPC ............ 119/14.04, 650, 651, 665, 670
See application file for complete search history.

(56) References Cited

U.S. PATENT DOCUMENTS

| | | | |
|---|---|---|---|
| 3,174,457 A | 3/1965 | Lyttle et al. ................. 119/1 |
| 3,835,814 A | 9/1974 | Jacobs et al. ............ 119/14.04 |
| 4,306,454 A | 12/1981 | Olrik et al. ..................... 73/224 |
| 4,508,058 A | 4/1985 | Jakobson et al. ......... 119/14.02 |
| 4,617,876 A | 10/1986 | Hayes ......................... 119/155 |
| 4,726,322 A | 2/1988 | Torsius ..................... 119/14.14 |
| 4,735,172 A | 4/1988 | Wahlström et al. ......... 119/14.1 |
| 4,819,875 A | 4/1989 | Beal ................................. 239/97 |
| 4,867,103 A | 9/1989 | Montalescot et al. ..... 119/14.08 |
| 4,941,433 A | 7/1990 | Hanauer .................... 119/14.02 |
| 5,020,477 A | 6/1991 | Dessing et al. ............ 119/14.08 |
| 5,042,428 A | 8/1991 | van der Lely et al. |
| 5,069,160 A | 12/1991 | Street et al. ............... 119/14.08 |
| 5,088,447 A | 2/1992 | Spencer et al. ............ 119/51.02 |
| 5,285,746 A | 2/1994 | Moreau ..................... 119/14.03 |
| 5,379,721 A | 1/1995 | Dessing et al. ............ 119/14.08 |
| 5,412,420 A | 5/1995 | Ellis |
| 5,479,876 A | 1/1996 | Street et al. ............... 119/14.08 |
| 5,553,569 A | 9/1996 | Street et al. ................. 119/525 |
| 5,596,945 A | 1/1997 | van der Lely ............ 119/14.03 |
| 5,666,903 A | 9/1997 | Bull et al. .................. 119/14.01 |
| 5,678,506 A | 10/1997 | van der Berg et al. ... 119/14.18 |
| 5,718,185 A | 2/1998 | Pichler et al. ............. 119/14.04 |
| 5,722,343 A | 3/1998 | Aurik et al. ............... 119/14.02 |
| 5,784,994 A | 7/1998 | van der Lely ............ 119/14.08 |
| 5,816,190 A | 10/1998 | van der Lely ............ 119/14.08 |
| 5,862,776 A | 1/1999 | van den Berg ............. 119/14.1 |
| 5,918,566 A | 7/1999 | van den Berg ........... 119/14.02 |
| 5,934,220 A | 8/1999 | Hall et al. .................. 119/14.08 |
| 5,979,359 A | 11/1999 | Hansson .................... 119/14.08 |
| 6,050,219 A | 4/2000 | van der Lely |
| 6,055,930 A | 5/2000 | Stein et al. ................. 119/14.08 |
| 6,105,536 A | 8/2000 | DeWaard .................... 119/14.04 |
| 6,118,118 A | 9/2000 | van der Lely et al. ........ 250/221 |
| 6,167,839 B1 | 1/2001 | Isaksson et al. ........... 119/14.08 |
| 6,189,486 B1 | 2/2001 | Lindholm .................. 119/14.02 |
| 6,205,949 B1 | 3/2001 | van den Berg ........... 119/14.02 |
| 6,213,051 B1 | 4/2001 | Fransen ..................... 119/14.08 |
| 6,227,142 B1 | 5/2001 | Birk ........................... 119/14.08 |
| 6,234,109 B1 | 5/2001 | Andersson et al. ....... 119/14.08 |
| 6,234,110 B1* | 5/2001 | Xavier ...................... A01J 7/04 119/14.18 |
| 6,257,169 B1 | 7/2001 | Oosterling ................. 119/14.02 |
| 6,321,682 B1 | 11/2001 | Eriksson et al. ........... 119/14.44 |
| 6,323,942 B1 | 11/2001 | Bamji .......................... 356/5.01 |
| 6,341,575 B1 | 1/2002 | Forsén ....................... 119/14.08 |
| 6,363,883 B1 | 4/2002 | Birk ........................... 119/14.08 |
| 6,394,029 B1 | 5/2002 | Bowers |
| 6,401,654 B1 | 6/2002 | Hallsten et al. ........... 119/14.18 |
| 6,443,094 B1 | 9/2002 | DeWaard |
| 6,498,338 B2 | 12/2002 | Oosterling et al. |
| 6,532,892 B1 | 3/2003 | Nilsson ..................... 119/14.03 |
| 6,543,381 B1 | 4/2003 | Birk et al. ................. 119/14.08 |
| 6,550,420 B1 | 4/2003 | Bjork |
| 6,553,942 B1 | 4/2003 | Eriksson ...................... 119/670 |
| 6,568,352 B2 | 5/2003 | Fransen ....................... 119/668 |
| 6,591,784 B1 | 7/2003 | Eriksson ...................... 119/670 |
| 6,626,130 B1 | 9/2003 | Eriksson ...................... 119/670 |
| 6,729,262 B2 | 5/2004 | Ealy et al. ................. 119/14.08 |
| 6,864,914 B1 | 3/2005 | Birk ........................... 348/211.99 |
| 6,974,373 B2 | 12/2005 | Kriesel .......................... 452/157 |
| 6,976,644 B2 | 12/2005 | Troudt ........................ 239/587.1 |
| 7,039,220 B2 | 5/2006 | Kriesel .......................... 382/110 |
| 7,128,020 B2 | 10/2006 | Björk et al. ............... 119/14.18 |
| 7,146,928 B2 | 12/2006 | Ealy et al. ................. 119/14.08 |
| 7,246,571 B2 | 7/2007 | Van Den Berg et al. .......... 119/14.08 |
| 7,299,766 B2 | 11/2007 | Van Den Berg et al. .......... 119/14.02 |
| 7,310,882 B2 | 12/2007 | Siraky et al. |
| 7,377,232 B2 | 5/2008 | Holmgren et al. ........... 119/670 |
| 7,690,327 B2 | 4/2010 | Van Den Berg ........... 119/14.02 |
| 7,882,802 B2 | 2/2011 | Van Den Berg et al. .......... 119/14.08 |
| 8,036,429 B2 | 10/2011 | Doyle, II ...................... 382/110 |
| 8,074,600 B2 | 12/2011 | Källén et al. ............... 119/14.04 |
| 8,210,122 B2 | 7/2012 | Pettersson et al. ........ 119/14.08 |
| 8,671,885 B2 | 3/2014 | Hofman |
| 9,433,184 B2* | 9/2016 | Hofman .................... A01J 7/04 |
| 9,737,043 B2* | 8/2017 | Hofman .................... A01J 7/04 |
| 2001/0024514 A1 | 9/2001 | Matsunaga .................. 382/106 |
| 2002/0108576 A1 | 8/2002 | Lely et al. ................. 119/14.02 |
| 2003/0097990 A1 | 5/2003 | Bjork et al. ............... 119/14.08 |
| 2004/0103846 A1 | 6/2004 | Fransen ..................... 119/14.03 |
| 2005/0223997 A1 | 10/2005 | Umegard ................... 119/14.03 |

(56) References Cited

U.S. PATENT DOCUMENTS

| | | | |
|---|---|---|---|
| 2006/0196431 A1 | 9/2006 | Kaever et al. | 119/14.04 |
| 2007/0137579 A1 | 6/2007 | Osthues et al. | 119/14.03 |
| 2007/0245964 A1 | 10/2007 | Van Den Berg et al. | 119/14.08 |
| 2007/0277737 A1 | 12/2007 | Maier et al. | 119/14.45 |
| 2008/0202432 A1 | 8/2008 | Petterson | 119/14.03 |
| 2010/0031889 A1 | 2/2010 | Eriksson et al. | 119/14.02 |
| 2010/0095893 A1 | 4/2010 | Kallen et al. | 119/14.04 |
| 2010/0186675 A1 | 7/2010 | Van Den Berg | 119/14.03 |
| 2010/0282172 A1 | 11/2010 | Eriksson et al. | 119/14.02 |
| 2010/0289649 A1 | 11/2010 | Holmgren et al. | 340/573.3 |
| 2011/0114024 A1 | 5/2011 | Van Den Berg | 119/14.02 |
| 2011/0239945 A1 | 10/2011 | Van Den Berg | 119/14.02 |
| 2012/0000427 A1 | 1/2012 | Nilsson | 119/14.02 |
| 2012/0006269 A1 | 1/2012 | McCain et al. | 119/14.02 |
| 2012/0180729 A1 | 7/2012 | Van Dorp | 119/14.08 |

FOREIGN PATENT DOCUMENTS

| | | | | |
|---|---|---|---|---|
| AT | 404 537 B | 12/1998 | | A01J 7/04 |
| AT | 406 108 B | 2/2000 | | A01J 5/00 |
| AU | 2005222545 A1 | 11/2005 | | A01J 5/017 |
| CA | 1 253 956 | 5/1989 | | A01J 7/00 |
| CA | 2 313 533 A1 | 6/1999 | | G06T 1/00 |
| CA | 2 315 018 A1 | 7/1999 | | G06T 1/00 |
| DE | 37 42 867 A1 | 7/1989 | | A01J 5/017 |
| DE | 39 38 077 A1 | 5/1991 | | A01J 5/017 |
| DE | 689 19 414 T3 | 5/1995 | | A01J 5/017 |
| DE | 691 16 926 T2 | 11/1996 | | A01J 5/017 |
| DE | 196 36 551 A1 | 3/1998 | | A01J 5/017 |
| DE | 689 28 489 T2 | 4/1998 | | A01J 5/00 |
| DE | 38 75 414 T3 | 8/1999 | | A01J 5/00 |
| DE | 691 32 321 T2 | 2/2001 | | A01J 5/017 |
| DE | 102 12 676 C1 | 3/2002 | | A01K 1/12 |
| DK | 144542 B | 5/1980 | | A01J 7/00 |
| DK | 147721 B | 7/1981 | | A01J 5/04 |
| DK | 218482 A | 11/1983 | | A01J 5/10 |
| DK | 328482 A | 1/1984 | | A01J 7/00 |
| DK | 169247 B1 | 9/1994 | | A01J 5/00 |
| DK | 173139 B1 | 6/1998 | | A01J 5/04 |
| EP | 0 188 303 A1 | 7/1986 | | A01J 7/00 |
| EP | 0 209 202 A1 | 1/1987 | | A01J 7/00 |
| EP | 0 229 682 A1 | 7/1987 | | A01J 7/00 |
| EP | 0 232 568 A1 | 8/1987 | | G01S 15/88 |
| EP | 0 119 222 B1 | 4/1988 | | A01J 5/04 |
| EP | 0 300 582 A1 | 1/1989 | | A01J 7/00 |
| EP | 0 306 579 A1 | 3/1989 | | A01J 5/017 |
| EP | 0 309 036 A1 | 3/1989 | | A01J 7/00 |
| EP | 0 327 037 A2 | 8/1989 | | A01M 7/00 |
| EP | 0 329 248 A1 | 8/1989 | | A01J 7/00 |
| EP | 0 349 019 A2 | 1/1990 | | A01J 5/08 |
| EP | 0 360 354 A1 | 3/1990 | | A01J 7/00 |
| EP | 0 432 148 A2 | 6/1991 | | A01K 1/12 |
| EP | 0 440 313 A2 | 8/1991 | | G01S 15/42 |
| EP | 0 448 132 A2 | 9/1991 | | A01J 7/00 |
| EP | 0 455 305 A1 | 11/1991 | | G01S 7/48 |
| EP | 0 467 489 A1 | 1/1992 | | A01J 7/00 |
| EP | 0 472 247 A2 | 2/1992 | | A01J 7/00 |
| EP | 0 479 397 A2 | 4/1992 | | A01J 7/00 |
| EP | 0 511 722 A2 | 11/1992 | | A01D 7/00 |
| EP | 0 511 723 A2 | 11/1992 | | A01D 7/00 |
| EP | 0 516 246 A2 | 12/1992 | | A01D 7/00 |
| EP | 0 541 517 A2 | 5/1993 | | A01J 7/00 |
| EP | 0 545 916 A2 | 6/1993 | | A01J 7/00 |
| EP | 0 548 058 A2 | 6/1993 | | A01K 1/12 |
| EP | 0 553 940 A2 | 8/1993 | | A01J 7/00 |
| EP | 0 565 189 A2 | 10/1993 | | A01J 7/00 |
| EP | 0 574 089 A2 | 12/1993 | | G01S 7/48 |
| EP | 0 630 558 A2 | 12/1994 | | A01J 7/00 |
| EP | 0 634 097 A1 | 1/1995 | | A01K 1/12 |
| EP | 0 643 907 A2 | 3/1995 | | A01J 7/00 |
| EP | 0 688 498 A2 | 12/1995 | | A01J 7/00 |
| EP | 0 689 762 A1 | 1/1996 | | A01K 1/12 |
| EP | 0 779 025 A2 | 6/1997 | | A01J 5/017 |
| EP | 0 789 995 A1 | 8/1997 | | A01J 7/04 |
| EP | 0 824 857 A1 | 2/1998 | | A01J 5/017 |
| EP | 0 880 889 A2 | 12/1998 | | A01J 5/017 |
| EP | 0 900 522 A1 | 3/1999 | | A01J 5/017 |
| EP | 0 951 651 B1 | 10/1999 | | G01S 17/00 |
| EP | 1 089 614 B1 | 4/2001 | | A01J 7/02 |
| EP | 1 211 928 B1 | 6/2002 | | A01J 5/017 |
| EP | 1 253 440 A1 | 10/2002 | | G01S 7/481 |
| EP | 1 316 253 A2 | 11/2002 | | A01K 1/12 |
| EP | 1 279 327 A2 | 1/2003 | | A01J 5/017 |
| EP | 1 388 281 A1 | 2/2004 | | A01J 7/02 |
| EP | 1 447 002 A1 | 8/2004 | | A01J 5/017 |
| EP | 1 460 453 A1 | 9/2004 | | G01S 17/89 |
| EP | 1 520 468 A1 | 4/2005 | | A01J 7/04 |
| EP | 1 537 774 A1 | 6/2005 | | A01J 5/017 |
| EP | 1 537 775 A1 | 6/2005 | | A01J 5/017 |
| EP | 1 523 882 A2 | 3/2009 | | A01K 1/12 |
| EP | 2 241 179 A1 | 10/2010 | | A01K 1/12 |
| ES | 2 064 892 T3 | 2/1995 | | A01J 5/017 |
| FI | 88099 B | 12/1992 | | A01J 7/00 |
| FI | 20002169 A | 4/2002 | | A01J 5/01 |
| FR | 2 595 197 A1 | 9/1987 | | A01J 5/017 |
| GB | 1 415 318 | 1/1973 | | |
| GB | 2 184 233 A | 6/1987 | | G01N 21/89 |
| GB | 2 218 888 | 11/1989 | | A01J 7/00 |
| JP | 62-159078 A | 7/1987 | | A01J 5/00 |
| JP | 9-196631 A | 7/1997 | | G01B 11/00 |
| JP | 9-243315 A | 9/1997 | | A01J 5/00 |
| JP | 9-275834 A | 10/1997 | | A01J 5/00 |
| JP | 9-285234 A | 11/1997 | | A01J 5/00 |
| JP | 11-276002 A | 10/1999 | | A01J 5/00 |
| JP | 11-281340 A | 10/1999 | | A01J 5/00 |
| JP | 2001-504944 A | 4/2001 | | A01J 5/00 |
| JP | 2002-521007 A | 7/2002 | | A01J 5/00 |
| JP | 2002-253075 A | 9/2002 | | A01J 5/00 |
| NL | 8502039 A | 2/1987 | | A01J 5/017 |
| NL | 8503580 A | 7/1987 | | A01J 5/00 |
| NL | 8600076 A | 8/1987 | | A01J 5/00 |
| NL | 8602699 A | 5/1988 | | A01J 5/017 |
| NL | 8800042 A | 8/1989 | | A01J 5/017 |
| NL | 8801785 A | 2/1990 | | A01J 5/017 |
| NL | 9101088 A | 1/1993 | | A01J 7/00 |
| NL | 9201434 A | 3/1994 | | A01J 5/017 |
| NL | 9201902 A | 6/1994 | | A01J 5/017 |
| NL | 9400220 A | 9/1995 | | A01J 5/017 |
| NL | 9400471 A | 11/1995 | | A01J 5/017 |
| NL | 9500276 A | 9/1996 | | A01J 5/017 |
| NL | 9500277 A | 9/1996 | | A01J 5/017 |
| NL | 9500363 A | 10/1996 | | A01J 5/017 |
| NL | 9500566 A | 11/1996 | | A01J 5/01 |
| NL | 1 009 632 C2 | 7/1998 | | A01J 5/017 |
| NL | 1006804 C2 | 2/1999 | | A01J 5/00 |
| NL | 1009711 C2 | 1/2000 | | A01J 5/00 |
| NL | 1013026 C2 | 3/2001 | | A01J 5/017 |
| NL | 1018563 C1 | 1/2003 | | A01J 5/017 |
| SE | 419 901 B | 8/1981 | | A01J 7/00 |
| SE | 425 821 B | 11/1982 | | A01J 7/00 |
| SE | 433 553 B | 6/1984 | | A01J 5/10 |
| SE | 512 334 C2 | 2/2000 | | A01J 5/017 |
| WO | WO 96/20587 A1 | 7/1996 | | A01J 5/017 |
| WO | WO 97/15183 A1 | 5/1997 | | A01J 5/017 |
| WO | WO 97/15901 A1 | 5/1997 | | G06T 7/00 |
| WO | WO 97/37528 A1 | 10/1997 | | A01J 5/017 |
| WO | WO 98/01022 A1 | 1/1998 | | A01J 7/00 |
| WO | WO 98/35547 A1 | 8/1998 | | A01J 5/017 |
| WO | WO 98/44782 A1 | 10/1998 | | A01J 5/017 |
| WO | WO 98/45808 A1 | 10/1998 | | G06T 1/00 |
| WO | WO 98/47348 A1 | 10/1998 | | A01J 5/017 |
| WO | WO 99/09430 A2 | 2/1999 | | G01S 17/00 |
| WO | WO 99/30277 A1 | 6/1999 | | G06T 1/00 |
| WO | WO 99/33020 A1 | 7/1999 | | G06T 1/00 |
| WO | WO 00/04763 A1 | 2/2000 | | A01J 5/017 |
| WO | WO 00/04765 A1 | 2/2000 | | A01J 5/017 |
| WO | WO 00/11935 A1 | 3/2000 | | A01J 5/017 |
| WO | WO 00/11936 A1 | 3/2000 | | A01J 5/017 |
| WO | WO 00/11940 A1 | 3/2000 | | A01K 11/00 |
| WO | WO 00/62602 A1 | 10/2000 | | A01J 5/017 |
| WO | WO 01/19171 A1 | 3/2001 | | A01J 5/017 |
| WO | WO 01/19172 A1 | 3/2001 | | A01J 5/017 |

(56) References Cited

FOREIGN PATENT DOCUMENTS

| | | | |
|---|---|---|---|
| WO | WO 01/52633 A1 | 7/2001 | ............. A01J 5/017 |
| WO | WO 02/00011 A1 | 1/2002 | ............. A01J 5/017 |
| WO | WO 02/07098 A1 | 1/2002 | ............. G06T 7/00 |
| WO | WO 02/15676 A1 | 2/2002 | ............. A01J 5/017 |
| WO | WO 02/082201 A1 | 10/2002 | ............. G05D 1/02 |
| WO | WO 03/055297 A1 | 7/2003 | ............. A01J 5/017 |
| WO | WO 2005/015985 A2 | 2/2005 | |
| WO | WO 2006/038840 A1 | 4/2006 | ............. A01K 1/12 |
| WO | WO 2007/050012 A1 | 5/2007 | ............. A01J 5/017 |
| WO | WO 2007/142586 | 12/2007 | |
| WO | WO 2008/030085 A1 | 3/2008 | ............. A01J 5/017 |
| WO | WO 2008/030116 A1 | 3/2008 | ............. A01K 1/12 |
| WO | WO 2008/058723 A1 | 5/2008 | ............. A01J 7/02 |
| WO | WO 2008/118068 A1 | 10/2008 | ............. A01K 1/12 |
| WO | WO 2009/093965 A1 | 7/2009 | ............. A01J 5/017 |
| WO | WO 2010/012625 A2 | 2/2010 | ............. A01J 5/017 |
| WO | WO 2010/014002 A9 | 2/2010 | ............. A01K 1/12 |
| WO | WO 2010/046669 A1 | 4/2010 | ............. A01J 5/017 |
| WO | WO 2010/110663 A1 | 9/2010 | ............. A01J 5/017 |
| WO | WO 2010/119079 A2 | 10/2010 | ............. A01K 1/12 |
| WO | WO 2011/023620 A2 | 3/2011 | ............. A01J 5/017 |
| WO | WO 2011/098454 A1 | 8/2011 | ............. A01K 1/12 |
| WO | WO 2011/098994 A2 | 8/2011 | ............. A01J 5/017 |
| WO | WO 2011/102717 A1 | 8/2011 | ............. A01K 1/12 |
| WO | WO 2011/117386 A2 | 9/2011 | ............... A01J 5/00 |

OTHER PUBLICATIONS

Canadian Intellectual Property Office; Office Action for Application No. 2,784,070; 3 pages, dated Oct. 1, 2012.
PCT Notification of Transmittal of the International Search Report and the Written Opinion of the International Searching Authority for International Application No. PCT/US2012/035107; 28 pages, dated Oct. 16, 2012.
U.S. Appl. No. 13/095,983, filed Apr. 28, 2011, Henk Hofman.
U.S. Appl. No. 13/095,994, filed Apr. 28, 2011, Henk Hofman.
U.S. Appl. No. 13/448,751, filed Apr. 17, 2012, Henk Hofman.
U.S. Appl. No. 13/448,799, filed Apr. 17, 2012, Henk Hofman.
U.S. Appl. No. 13/448,840, filed Apr. 17, 2012, Henk Hofman.
U.S. Appl. No. 13/448,873, filed Apr. 17, 2012, Henk Hofman.
U.S. Appl. No. 13/448,882, filed Apr. 17, 2012, Henk Hofman.
U.S. Appl. No. 13/448,897, filed Apr. 17, 2012, Henk Hofman.
U.S. Appl. No. 13/448,913, filed Apr. 17, 2012, Henk Hofman.
U.S. Appl. No. 13/448,929, filed Apr. 17, 2012, Henk Hofman.
U.S. Appl. No. 13/448,951, filed Apr. 17, 2012, Henk Hofman.
U.S. Appl. No. 13/448,993, filed Apr. 17, 2012, Henk Hofman.
U.S. Appl. No. 14/449,002, filed Apr. 17, 2012, Henk Hofman.
U.S. Appl. No. 13/449,056, filed Apr. 17, 2012, Henk Hofman.
U.S. Appl. No. 13/449,105, filed Apr. 17, 2012, Henk Hofman.
U.S. Appl. No. 13/449,142, filed Apr. 17, 2012, Henk Hofman.
U.S. Appl. No. 13/449,162, filed Apr. 17, 2012, Henk Hofman.
U.S. Appl. No. 13/449,173, filed Apr. 17, 2012, Henk Hofman.
U.S. Appl. No. 13/449,951, filed Apr. 18, 2012, Henk Hofman.
U.S. Appl. No. 13/451,248, filed Apr. 19, 2012, Henk Hofman.
U.S. Appl. No. 13/454,281, filed Apr. 24, 2012, Henk Hofman.
U.S. Appl. No. 13/454,298, filed Apr. 24, 2012, Henk Hofman.
U.S. Appl. No. 13/454,351, filed Apr. 24, 2012, Henk Hofman.
U.S. Appl. No. 13/454,386, filed Apr. 24, 2012, Henk Hofman.
U.S. Appl. No. 13/454,490, filed Apr. 24, 2012, Henk Hofman.
U.S. Appl. No. 13/454,670, filed Apr. 24, 2012, Henk Hofman.
U.S. Appl. No. 13/454,716, filed Apr. 24, 2012, Henk Hofman.
U.S. Appl. No. 13/454,833, filed Apr. 24, 2012, Henk Hofman.
U.S. Appl. No. 13/454,876, filed Apr. 24, 2012, Henk Hofman.
U.S. Appl. No. 13/454,913, filed Apr. 24, 2012, Henk Hofman.
U.S. Appl. No. 13/454,953, filed Apr. 24, 2012, Henk Hofman.
U.S. Appl. No. 13/454,975, filed Apr. 24, 2012, Henk Hofman.
Jan W. Weingarten, et al.; *A State-of-the-Art 3D Sensor for Robot Navigation*; 6 pages, Sep. 2004.
PCT International Patent Application No. PCT/NL2010/050154 entitled *Robot and Method for Milking a Cow by this Robot*; 19 pages, Mar. 25, 2010.
PCT Invitation to Pay Additional Fees and, Where Applicable, Protest Fee and Partial National Search Report for Application No. PCT/US2012/035074; 7 pages, dated Jul. 16, 2012.
PCT Notification of Transmittal of the International Search Report and the Written Opinion of the International Searching Authority for Application No. PCT/US2012/033894; 11 pages, dated Jul. 23, 2012.
PCT Invitation to Pay Additional Fees and, Where Applicable, Protest Fee and Partial National Search Report for Application No. PCT/US2012/035077; 7 pages, dated Jul. 25, 2012.
PCT Invitation to Pay Additional Fees and, Where Applicable, Protest Fee and Partial National Search Report for Application No. PCT/US2012/035079; 8 pages, dated Jul. 31, 2012.
PCT Notification of Transmittal of the International Search Report and the Written Opinion of the International Searching Authority for Application No. PCT/US2012/033892; 13 pages, dated Jul. 31, 2012.
PCT Notification of Transmittal of the International Search Report and the Written Opinion of the International Searching Authority for .Application No. PCT/US2012/035356; 14 pages, dated Jul. 31, 2012.
PCT Invitation to Pay Additional Fees and, Where Applicable, Protest Fee and Partial National Search Report for Application No. PCT/US2012/035107; 7 pages, dated Jul. 31, 2012.
Canadian Intellectual Property Office; Office Action for Application No. 2,775,130; 4 pages, dated Jul. 30, 2013.
PCT Notification of Transmittal of the International Search Report and the Written Opinion of the International Searching Authority for Application No. PCT/US2012/035074; 19 pages, dated Dec. 12, 2012.
First Examination Report from New Zealand Intellectual Property Office IP No. 605830, 2 pages, dated Oct. 25, 2013.
Hofman et al., U.S. Appl. No. 13/095,977, "Vision System for Facilitating the Automated Application of Disinfectant to the Teats of Dairy Livestock," filed Apr. 28, 2011.
PCT Notification of Transmittal of the International Search Report and the Written Opinion of the International Searching Authority for International Application No. PCT/US2011/047510; 9 pages, dated Jan. 2, 2012.
PCT Notification of Transmittal of the International Search Report and the Written Opinion of the International Searching Authority for International Application No. PCT/US2011/047511; 9 pages, dated Jan. 2, 2012.
Canadian Intellectual Property Office; Office Action for Application No. 2,775,132; 3 pages, dated Aug. 20, 2012.
Canadian Intellectual Property Office; Office Action for Application No. 2,775,130; 4 pages, dated Nov. 27, 2012.
Canadian Intellectual Property Office; Office Action for Application No. 2,775,177; 3 pages, dated Nov. 27, 2012.
Canadian Intellectual Property Office; Office Action for Application No. 2,775,130; 2 pages, dated Aug. 20, 2012.
Canadian Intellectual Property Office; Office Action for Application No. 2,775,169; 3 pages, dated Aug. 20, 2012.
Canadian Intellectual Property Office; Office Action for Application No. 2,775,177; 2 pages, dated Aug. 20, 2012.
Canadian Intellectual Property Office; Office Action for Application No. 2,775,252; 3 pages, dated Aug. 21, 2012.

\* cited by examiner

AUTOMATED SYSTEM FOR APPLYING DISINFECTANT TO THE TEATS OF DAIRY LIVESTOCK

RELATED APPLICATIONS

This application is a continuation of U.S. Ser. No. 15/177,375 dated Jun. 9, 2016 which is a continuation of Ser. No. 14/260,585 dated Apr. 24, 2014 which is now U.S. Pat. No. 9,433,184 issued Sep. 6, 2016, which is a divisional of U.S. Ser. No. 13/095,963 dated Apr. 28, 2011 which is now U.S. Pat. No. 8,707,905 issued Apr. 29, 2014 which claims the benefit under 35 U.S.C. § 119(e) of the priority of U.S. Provisional Application No. 61/378,871, filed Aug. 31, 2010, entitled "Automated System for Applying Disinfectant to the Teats of Dairy Livestock," the entire disclosure of which is hereby incorporated by reference.

TECHNICAL FIELD

This invention relates generally to dairy farming and more particularly to a automated system for applying disinfectant to the teats of dairy livestock.

BACKGROUND OF THE INVENTION

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY OF THE INVENTION

According to embodiments of the present disclosure, disadvantages and problems associated with previous systems supporting dairy milking operations may be reduced or eliminated.

In certain embodiments, a system for applying disinfectant to the teats of a dairy livestock includes a carriage mounted on a track, the carriage operable to translate laterally along the track. The system further includes a robotic arm including a first member pivotally attached to the carriage such that the first member may rotate about a point of attachment to the carriage, a second member pivotally attached to the first member such that the second member may rotate about a point of attachment to the first member, and a spray tool member pivotally attached to the second member such that the spray tool member may rotate about a point of attachment to the second member. The system further includes a controller operable to cause at least a portion of the robotic arm to extend between the hind legs of a dairy livestock such that a spray tool of the spray tool member is located at a spray position from which the spray tool may discharge an amount of disinfectant to the teats of the dairy livestock.

Particular embodiments of the present disclosure may provide one or more technical advantages. For example, certain embodiments of the present disclosure may provide an automated system for applying disinfectant to the teats of dairy livestock. Additionally, certain embodiments of the present disclosure may minimize overspray, thereby reducing the volume of the disinfectant needed. By reducing the need for human labor and reducing the volume of disinfectant used, certain embodiments of the present disclosure may reduce the cost associated with applying disinfectant to the teats of dairy livestock in certain dairy milking operations. Furthermore, the use of the automated system of the present disclosure in conjunction with a rotary milking platform may increase the throughput of the milking platform, thereby increasing the overall milk production of the milking platform.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1A:
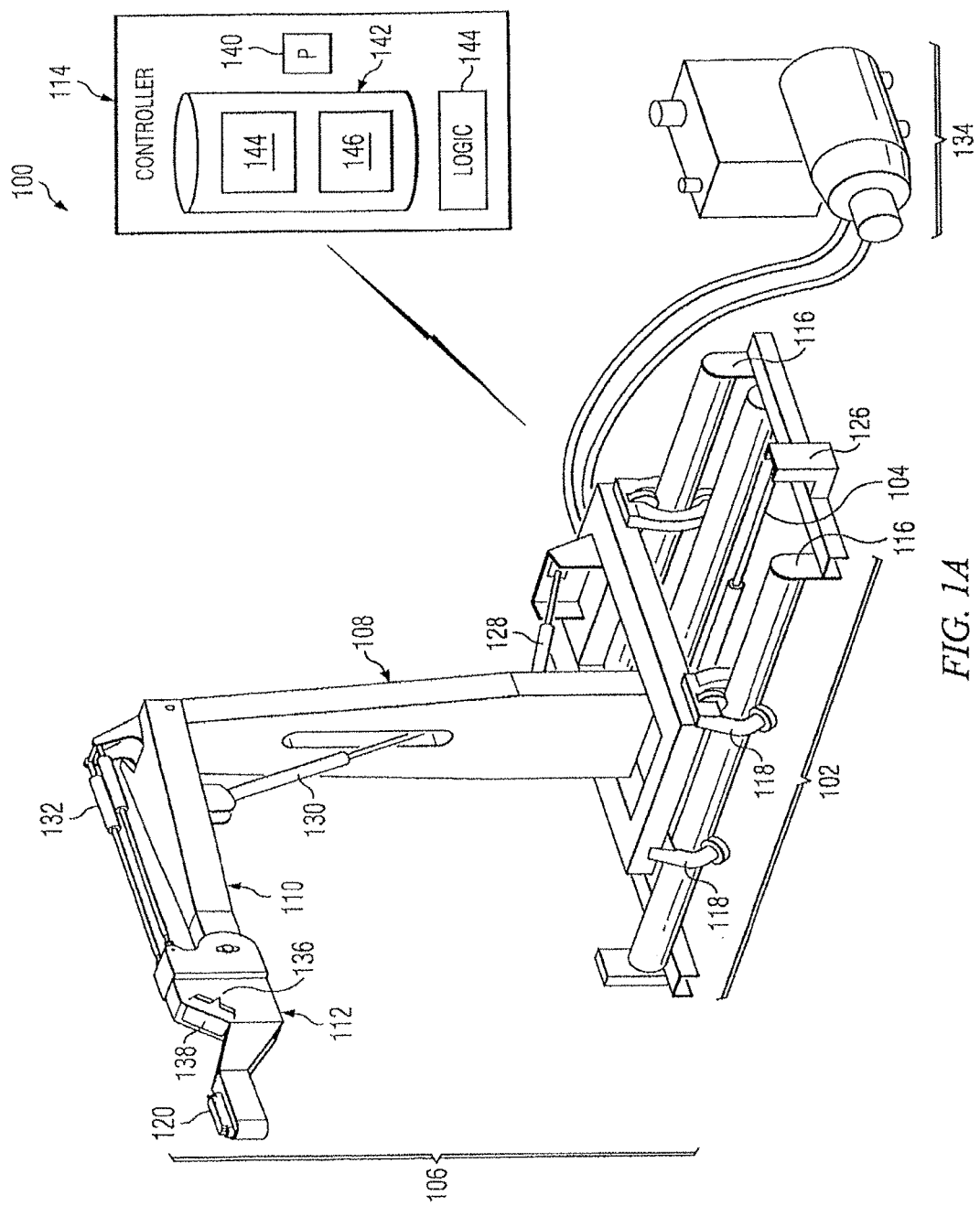
FIGS. 1A-1B illustrate perspective views of an example automated system for applying disinfectant to the teats of a dairy livestock, according to certain embodiments of the present disclosure.
Figure 1B:
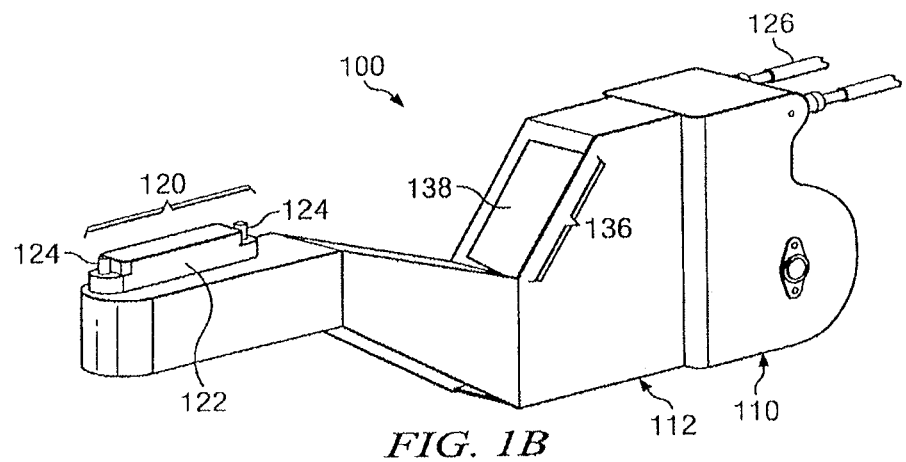

FIGS. 1A-1B illustrate perspective views of an example automated system 100 for applying disinfectant to the teats of a dairy livestock, according to certain embodiments of the present disclosure. System 100 includes a track 102 and a carriage 104, carriage 104 being mounted on track 102 such that carriage 104 is able to translate laterally along track 102. System 100 further includes a robotic arm 106 coupled to carriage 104. Robotic arm 106 includes a first member 108 pivotally attached to carriage 104, a second member 110 pivotally attached to first member 108, and a spray tool member 112 pivotally attached to second member 110. System 100 further includes a controller 114 operable to control the movement of carriage 104 and robotic arm 106 such that at least a portion of robotic arm 106 may extend between the hind legs of a dairy livestock in order to apply disinfectant to the teats of the dairy livestock.

Although a particular implementation of system 100 is illustrated and primarily described, the present disclosure contemplates any suitable implementation of system 100, according to particular needs. Additionally, although the present disclosure contemplates system 100 facilitating the application of any suitable liquid to the teats of any suitable dairy livestock (e.g., cows, goats, sheep, water buffalo, etc.), the remainder of this description is detailed with respect to the application of disinfectant to the teats of dairy cows.

Track 102 may include any suitable combination of structure and materials facilitating the attachment of carriage 104 thereto such that carriage 104 may translate laterally along track 102. Carriage 104 may include any suitable combination of structure and materials forming a base for robotic arm 106 that may translate laterally along track 102. For example, track 102 may include one or more tubular track members 116 each corresponding to one or more rollers 118 of carriage 104. Rollers 118 of carriage 104 may roll along track members 116, permitting carriage 104 to translate laterally along track 102.

Figure 2:
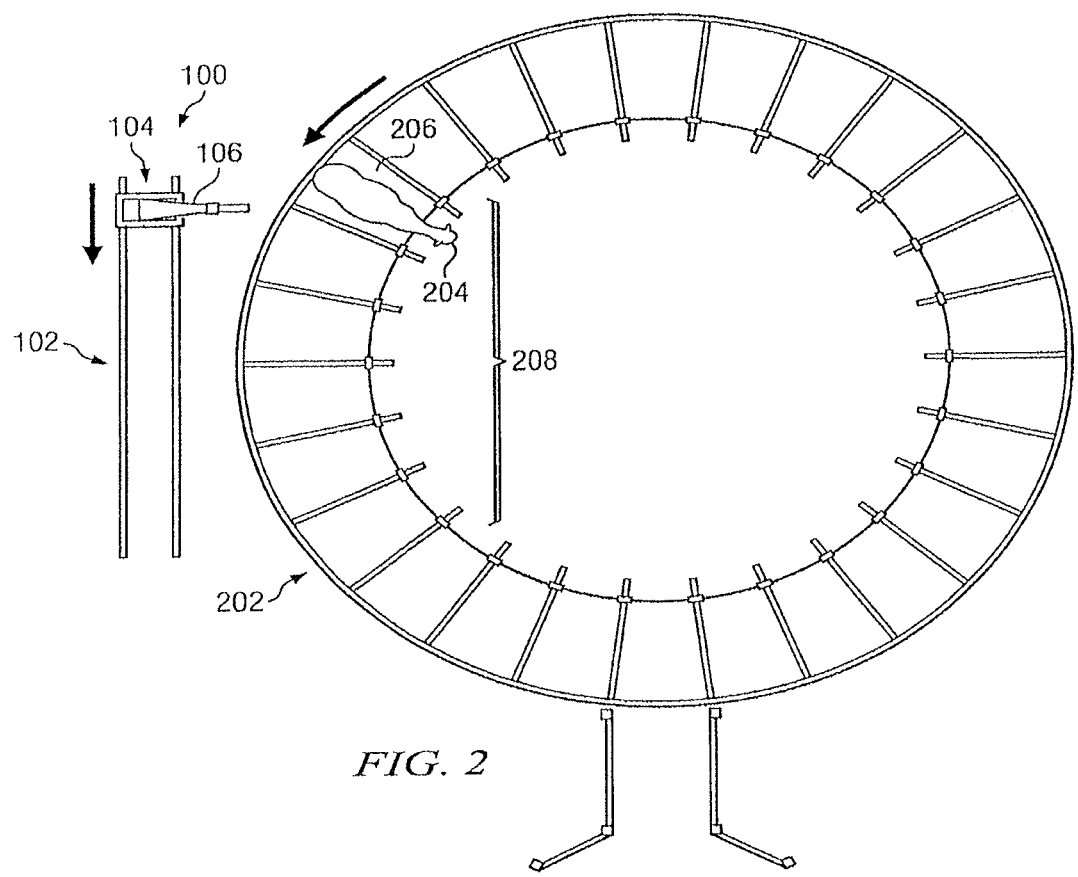
FIG. 2 illustrates the automated system for applying disinfectant to the teats of a dairy livestock depicted in FIG. 1 positioned adjacent to a rotary milking platform, according to certain embodiments of the present disclosure.

In certain embodiments, as illustrated in FIG. 2, system 100 may be positioned adjacent to a rotary milking platform 202 such that carriage 104 may move along track 102 tangent to a rotary milking platform 202. Movement of carriage 104 tangent to rotary milking platform 202 may permit robotic arm 106 to track the movement of a dairy cow 204 located in a milking stall 206 of the rotary milking platform 202. Accordingly, at least a portion of robotic arm 106 may remain extended between the hind legs of the dairy cow 204 (as discussed detail below) as the dairy cow 204 rotates through the area 208 of the rotary milking platform 202 located adjacent to system 100. Although system 100 is primarily described as being used in conjunction with milking stalls 206 of a rotary milking platform 202 throughout the remainder of this description, the present disclosure contemplates system 100 being used in conjunction with any suitable type of milking stall, according to particular needs.

Returning to FIGS. 1A-1B, robotic arm 106 may include a first member 108 pivotally attached to carriage 104 such that first member 108 may rotate about a point of attachment to carriage 104. Robotic arm 106 may additionally include a second member 110 pivotally attached to first member 108 such that second member 110 may rotate about a point of attachment to first member 108. Robotic arm 106 may additionally include a spray tool member 112 pivotally attached to second member 110 such that spray tool member 112 may rotate about a point of attachment to second member 110. Although members 108-112 of robotic arm 106 are depicted as having a particular structure, the present disclosure contemplates members 108-112 each having any suitable structure, according to particular needs.

In certain embodiments, robotic arm 106 may additionally include a spray tool 120 attached to spray tool member 112. Spray tool 120 may be operable to discharge an amount of disinfectant to the teats of a dairy cow. For example (as depicted in FIG. 1B), spray tool 120 may include a linear member 122 having a spray nozzle 124 located at either end. Linear member 122 may be operable to rotate about the point attachment to spray tool member 112 such that spray nozzles 124 may discharge the disinfectant in a substantially circular pattern. As a result, the width of spray tool member 112 (including spray tool 120) may be minimized as spray tool member 112 passes between the hind legs of a dairy cow (as described below) while having a spray coverage area wide enough to cover each of the teats of a dairy cow once the spray tool member 112 is positioned beneath the dairy cow.

In certain embodiments, system 100 may include a first actuator 126, a second actuator 128, a third actuator 130, and a fourth actuator 132. Actuators 126-132 may each be operable to extend and retract to cause movement of carriage 102 and/or robotic arm 106 (as described in detail below). For example, the extension/retraction of actuators 126-132 may be governed by an actuator drive mechanism 134. Actuator drive mechanism 134 may include a hydraulic pump, a pneumatic pump, or any other suitable drive mechanism operable to cause extension/retraction of actuators 126-132.

First actuator 126 may be attached to track 102 and carriage 104 such that extension/retraction of first actuator 126 causes movement of carriage 104 along track 102. Second actuator 128 may be attached to carriage 104 and first member 108 such that extension/retraction of second actuator 128 causes rotation of first member 108 about the point of attachment to carriage 104. Third actuator 130 may be attached to first member 108 and second member 110 such that extension/retraction of third actuator 130 causes rotation of second member 110 about the point of attachment to first member 108. Fourth actuator 132 may be attached to second member 110 and spray tool member 112 such that extension/retraction of fourth actuator 132 causes rotation of spray tool member 112 about the point of attachment to second member 110.

In certain embodiments, spray tool member 112 may include a vision system 136 housing a camera 138. Camera 138 may include any suitable camera operable to generate one or more image signals (e.g., image signal 146, described below) corresponding to the rear and/or underside of a dairy cow (e.g., a dairy cow located in a milking stall of an adjacent rotary milking platform). For example, camera 138 may be a three-dimensional camera operable to generate a three-dimensional video image signal corresponding to the rear of a dairy cow and, as robotic arm 106 moves between the hind legs of the dairy cow, a three-dimensional video image signal corresponding the underside of the dairy cow. Based on the image signal(s) generated by camera 138, controller 114 may determine a spray position at which spray tool 120 may be positioned in order to apply disinfectant to the teats of the dairy cow (as described in detail below).

Although camera 138 is described as being a three-dimensional camera throughout the remainder of this description, the present disclosure contemplates camera 138 as being any suitable camera (e.g., a two-dimensional camera), according to particular needs. Additionally, although the vision system 136 housing camera 138 is depicted and primarily described as being positioned on spray tool member 112, the present disclosure contemplates vision system 136 being positioned at any suitable location.

In certain embodiments, various components of system 100 (e.g., spray tool 120, actuators 126-132, and camera 138) may be communicatively coupled to controller 114 (e.g., via a network facilitating wireless or wireline communication). Controller 114 may control the position of robotic arm 106 (e.g., by controlling the extension/retraction of actuator 126-132) such that at least a portion of robotic arm 106 extends between the hind legs of a dairy cow in order to discharge an amount of disinfectant to the teats of the dairy cow.

Controller 114 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, controller 114 may include any suitable combination of software, firmware, and hardware.

Controller 114 may additionally include one or more processing modules 140. The processing modules 140 may each include one or more microprocessors, controllers, or any other suitable computing devices or resources and may work, either alone or with other components of system 100, to provide a portion or all of the functionality of system 100 described herein. Controller 114 may additionally include (or be communicatively coupled to via wireless or wireline communication) one or more memory modules 142. The memory modules 142 may each include any memory or database module and may take the form of volatile or non-volatile memory, including, without limitation, magnetic media, optical media, random access memory (RAM), read-only memory (ROM), removable media, or any other suitable local or remote memory component.

Controller 114 may additionally include control logic 144. Control logic 144 may include any information, logic, and/or instructions stored and/or executed by controller 114 to (1) determine, based on an image signal generated by camera 138 (e.g., image signal 146, described below), a spray position from which spray tool member 120 may apply disinfectant to the teats of a dairy cow, and (2) control the movement of carriage 106 and/or robotic arm 106 such that spray tool member 120 may be positioned at or near the determined spray position.

In operation of an example embodiment of system 100 (an embodiment in which system 100 is positioned adjacent to a rotary milking platform having a milking stall in which a dairy cow is located), controller 114 may be operable to receive a trigger signal (e.g., from a proximity switch or any other suitable sensor associated with the rotary milking platform) indicating that a stall in which the dairy cow is located has entered an area adjacent to system 100 (e.g., area 208, described above). For example, system 100 may be located relative to a rotary milking platform (e.g., rotary milking platform 202), and disinfectant may be applied to the teats of the dairy cow after the dairy cow has been milked (i.e., after the milking cluster has been removed).

Because disinfectant may not need to be applied to the teats of the dairy cow if a milking cluster is attached, controller 114 may determine whether a milking cluster is attached. If controller 114 determines that a milking cluster is attached, no further action may be performed until a next dairy cow enters the area adjacent to system 100. If controller 114 determines that a milking cluster is not attached, controller 114 may initiate the disinfectant application process by communicating a signal to first actuator 126, the signal causing first actuator to extend such that carriage 102 translates laterally along track 104 in a direction corresponding to the direction of rotation of the rotary milking platform. In certain embodiments, controller 114 may also access a rotary encoder signal 144 generated by a rotary encoder of the rotary milking platform, the accessed rotary encoder signal 144 indicating the speed of rotation of rotary milking platform. Based on the rotary encoder signal 144, controller 114 may communicate a signal to first actuator 126 that causes first actuator 126 to extend at a rate that causes carriage 102 to translate laterally along track 104 at a rate corresponding to the rate of rotation of the rotary milking platform (such that robotic arm 106 may keep pace with the dairy cow located in the milking stall of the rotary milking platform).

Figure 3:
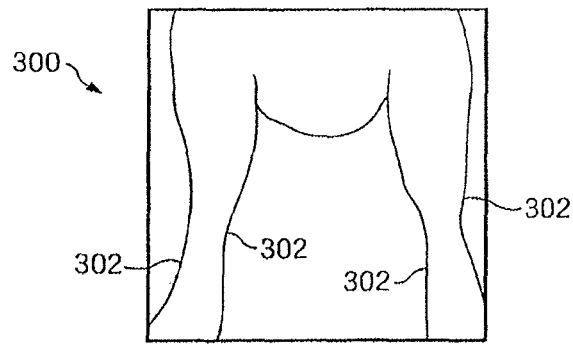
FIG. 3 illustrates an example snapshot of an image signal identifying located edges is depth corresponding to the edges of the hind legs of a dairy cow, according to certain embodiments of the present disclosure.

Controller 114 may be further operable to access an image signal 146 generated by camera 138. As discussed above, image signal 146 may be a three-dimensional video image signal corresponding (at least initially) to the rear of the dairy cow. Based on the accessed image signal 146, controller 114 may determine positions of each of the hind legs of the dairy cow. For example, controller 114 may process image signal 146 to locate edges in depth, which may correspond to portions of the image signal where the distance from an object transitions from being relatively close to camera 138 (i.e., the hind legs of the dairy cow) to relatively far away from camera 138 (i.e., the area on wither side of the hind legs of the dairy cow). Because the hind legs of the dairy cow may be relatively close to camera 138 as compared to the space located between/on either side of the hind legs, the located edges in depth may correspond to the location of the inside and outside edges of the hind legs of the dairy cow. FIG. 3 illustrates an example snapshot 300 of a image signal 146 identifying located edges is depth 302 corresponding to the edges of the hind legs of a dairy cow.

Returning to FIG. 1, controller 114, having determined the positions of each of the hind legs of the dairy cow, may communicate signals to one or more of actuators 126-132, the communicated signals causing extension/retraction of actuators 126-132 such that at least a portion of robotic arm 106 (e.g., spray tool member 112) extends toward the space between the hind legs of the dairy cow (e.g., at a predetermined height relative to the milking stall in which the dairy cow is located). Because image signal 146 may comprise a three-dimensional video image (as described above), the image signal 146 may change in real time as camera 138 moves toward the dairy cow. Accordingly, the present disclosure contemplates that controller 114 may update, either continuously or at predetermined intervals, the determined leg positions as image signal 146 changes.

Controller 114 may be further operable to determine a position of the udder of the dairy cow. In certain embodiments, controller 114 may determine the position of the udder of the dairy cow based on the accessed image 146 signal and/or the determined positions of the hind legs of the dairy cow. For example, controller 114 may process image signal 146 (which may change as the camera 138 moves toward the dairy cow, as described above) in order to trace the located edges in depth corresponding to the inside of the hind legs of the dairy cow (as described above) upwardly until they intersect with the udder of the dairy cow. In certain embodiments, controller 114 may process image signal 146 to determine where the edges in depth transition from being substantially vertical, indicating the inside of the hind legs, to substantially horizontal, indicating the udder (as illustrated in FIG. 3 by the edges in depth 302 corresponding to the inner side of the hind legs of the dairy cow).

Figure 4:
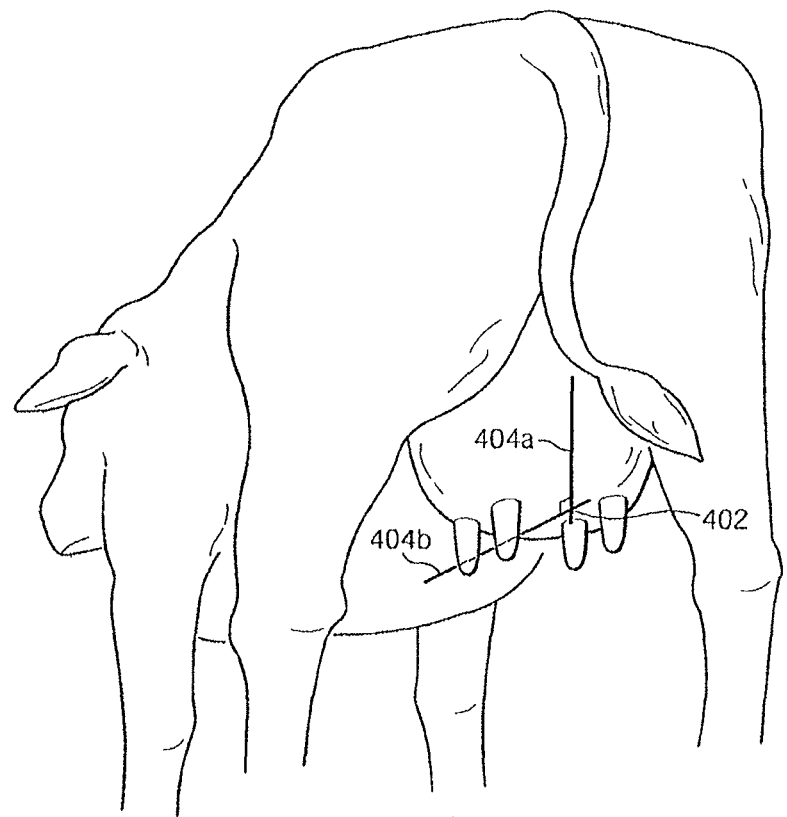
FIG. 4 illustrates an example spray position determined based on a tangent to the rear of the located udder a tangent to the bottom of the located udder, according to certain embodiments of the present disclosure.

Controller 114 may be further operable to determine a spray position from which spray tool 120 may apply disinfectant to the teats of the dairy cow. In certain embodiments, controller 114 may determine the spray position based on image signal 146 and/or the determined position of the udder of the dairy cow. For example, controller 114 may process image signal 146 (which may change as the camera 138 moves toward the dairy cow, as described above) in order to determine the shape of the udder of the dairy cow. Based on the determined shape, controller 114 may determine (1) a tangent to the rear of the located udder, and (2) a tangent to the bottom of the located udder. The spray position may then be determined relative to the intersection of the two tangents (e.g., a predetermined distance below the intersection). FIG. 4 illustrates an example spray position 402 determined by controller 114 based on a tangent 404*a* to the rear of the located udder a tangent 404*b* to the bottom of the located udder.

Returning to FIG. 1, controller 114, having determined the spray position, may communicate additional signals to actuators 126-132, these additional signals causing extension/retraction of actuators 126-132 such that spray tool 120 is positioned substantially at or near the spray position. Once positioned, controller 114 may initiate the discharge of a disinfectant to the teats of the dairy cow. For example, in embodiments in which spray tool 120 comprises a linear member 122 having a spray nozzle 124 at either end, controller 114 may communicate a signal to a valve controlling the flow of fluid to nozzles 124, the signal causing opening of the valve. Fluid pressure may then cause the spray tool member 122 to rotate about the point of attachment to spray tool member 112, causing the discharge of disinfectant in a substantially circular pattern. Member 122 may be sized and the spray pattern of nozzles 124 may be adjusted such that the sprayed circular pattern of disinfectant substantially covers the four teats of the dairy cow. Once the disinfectant has been applied to the teats of the dairy cow, controller 114 may communicate additional signals to actuators 126-132, these additional signals causing extension/retraction of actuators 126-132 such that carriage 104 and robotic arm 106 returns to a default position.

Particular embodiments of system 100 may provide one or more technical advantages. For example, certain embodiments of system 100 may reduce or eliminate the need for human labor to apply the disinfectant to the teats of dairy cow. Additionally, certain embodiments of system 100 may minimize overspray, thereby minimizing the volume of the expensive disinfectant used. Accordingly, certain embodiments of the present disclosure may reduce the cost associated with certain dairy milking operations. Furthermore, the use of system 100 in conjunction with a rotary milking platform may increase the throughput of the milking platform, thereby increasing the overall milk production of the milking platform.

Although a particular implementation of system 100 is illustrated and primarily described, the present disclosure contemplates any suitable implementation of system 100, according to particular needs. Moreover, although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

Figure 5A:
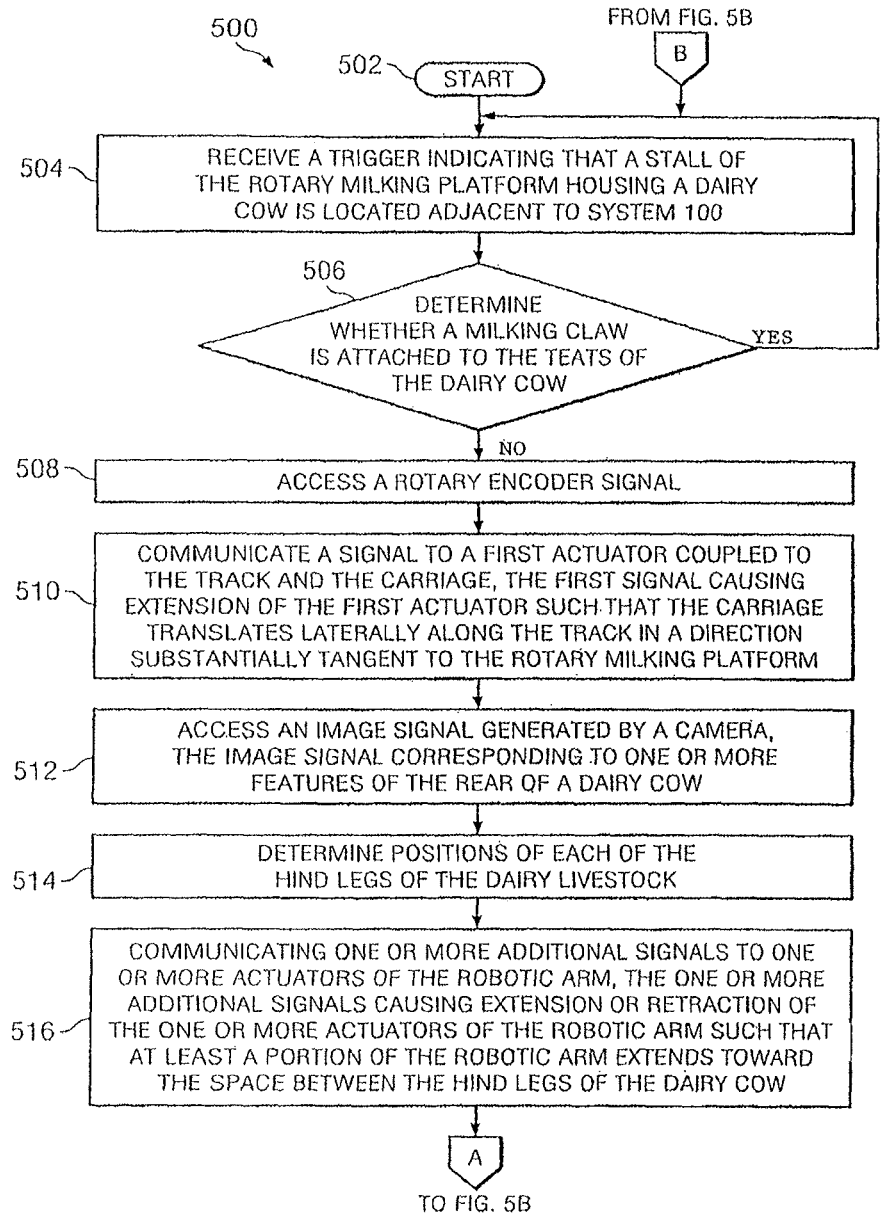
FIGS. 5A-5B illustrate an example method for applying disinfectant to the teats of a dairy livestock, according to certain embodiments of the present disclosure.
Figure 5B:
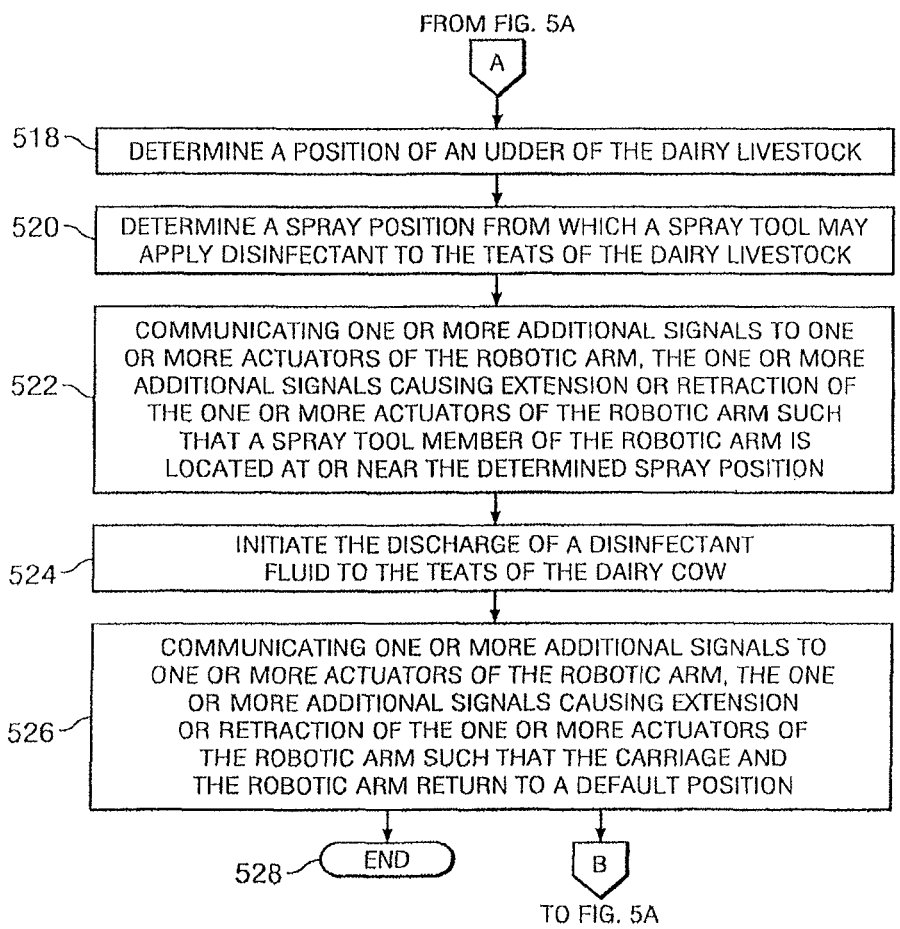

FIGS. 5A-5B illustrate an example method 500 for applying disinfectant to the teats of a dairy livestock, according to certain embodiments of the present disclosure. The method begins at step 502. At step 504, controller 114 receives a trigger indicating that a stall in which a dairy cow is located (e.g., a stall 206 of a rotary milking platform 202 positioned adjacent to system 100, as illustrated in FIG. 2) has entered an area adjacent to system 100 (e.g., area 208, as illustrated in FIG. 2). For example, the trigger may be received from a proximity switch or any other suitable sensor associated with the rotary milking platform.

At step 506, controller 114 determines whether a milking cluster is attached. If controller 114 determines that a milking cluster is attached, the method returns to step 504. If controller 114 determines that a milking cluster is not attached, the method proceeds to step 508 where controller 114 accesses a rotary encoder signal 144 indicating the speed of rotation of rotary milking platform. At step 510, controller 114 communicates a signal to first actuator 126, the signal causing first actuator to extend such that carriage 102 translates laterally along track 104 in a direction corresponding to the direction of rotation of the rotary milking platform. Additionally, the signal communicated to first actuator 126 causes the first actuator to extend at a rate (determined based on rotary encoder signal 144) that causes carriage 102 to translate laterally along track 104 at a rate corresponding to the rate of rotation of the rotary milking platform. As a result, robotic arm 106 may keep pace with a dairy cow located in a milking stall of the rotary milking platform.

At step 512, controller 114 accesses an image signal 146 generated by camera 138 (e.g., a three-dimensional video image signal corresponding, at least initially, to the rear of the dairy cow). At step 514, controller 114 determines positions of each of the hind legs of the dairy cow. For example, controller 114 may process image signal 146 to locate edges in depth, which may correspond to portions of the image signal where the distance from an object transitions from being relatively close to camera 138 (i.e., the hind legs of the dairy cow) to relatively far away from camera 138 (i.e., the area on wither side of the hind legs of the dairy cow). At step 516, controller 114 communicates signals to one or more of actuators 126-132, the communicated signals causing extension/retraction of actuators 126-132 such that at least a portion of robotic arm 106 (e.g., spray tool member 112) extends toward the space between the hind legs of the dairy cow (e.g., at a predetermined height relative to the milking stall in which the dairy cow is located).

At step 518, controller 114 determines a position of the udder of the dairy cow. In certain embodiments, controller 114 determines the position of the udder of the dairy cow based on the accessed image 146 signal and/or the determined positions of the hind legs of the dairy cow. For example, controller 114 may process image signal 146 (which may change as the camera 138 moves toward the dairy cow, as described above) in order to trace the located edges in depth corresponding to the inside of the hind legs of the dairy cow (as described above) upwardly until they intersect with the udder of the dairy cow.

At step 520, controller 114 determines a spray position from which spray tool 120 may apply disinfectant to the teats of the dairy cow. For example, controller 114 may process image signal 146 (which may change as the camera 138 moves toward the dairy cow, as described above) in order to determine the shape of the udder of the dairy cow. Based on the determined shape, controller 114 may determine (1) a tangent to the rear of the located udder, and (2) a tangent to the bottom of the located udder. The spray position may then be determined relative to the intersection of the two tangents (e.g., a predetermined distance below the intersection).

At step 522, controller 114 communicates additional signals to actuators 126-132, the additional signals causing extension/retraction of actuators 126-132 such that spray tool 120 is positioned substantially at or near the spray position. Once positioned, controller 114 may initiate the discharge of a disinfectant to the teats of the dairy cow at step 524. Once the disinfectant has been applied to the teats of the dairy cow, controller 114 may, at step 526, communicate additional signals to actuators 126-132, these additional signals causing extension/retraction of actuators 126-132 such that carriage 104 and robotic arm 106 returns to a default position. The method then either returns to step 504 (if there are additional dairy cows to which disinfectant is to be applied) or ends at step 528 (if there are no additional dairy cows to which disinfectant is to be applied).

Although the steps of method 500 have been described as being performed in a particular order, the present disclosure contemplates that the steps of method 500 may be performed in any suitable order, according to particular needs.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A method for applying disinfectant to the teats of a dairy livestock, comprising:
   moving a robotic arm along a track in relation to a rotary milking platform housing a dairy livestock and independent of any physical coupling between the robotic arm and the rotary milking platform, wherein the rotary milking platform has a substantially circular perimeter, the track is positioned outside the perimeter of the rotary milking platform, at least a portion of the track is straight and offset in relation to the rotary milking platform, and the robotic arm comprises:
      an arm member operable to pivot about an axis that is parallel to the track; and
      a spray tool attached to one end of the arm member;
   extending the robotic arm between the hind legs of the dairy livestock while the rotary milking platform rotates such that the spray tool is located at a spray position from which it may discharge disinfectant to the teats of the dairy livestock.

2. The method of claim 1, further comprising:
   pivoting the arm member about the axis; and
   rotating the spray tool about a point of attachment to the arm member.

3. The method of claim 1, further comprising accessing a rotary encoder signal generated by a rotary encoder of the rotary milking platform, the rotary encoder signal based at least in part upon a rotational speed of the rotary milking platform.

4. The method of claim 3, wherein moving the robotic arm comprises moving the robotic arm along the track at a speed based at least in part upon the rotational speed of the rotary milking platform.

5. The method of claim 1, further comprising applying disinfectant to the teats of the dairy livestock using the spray tool.

6. The method of claim 1, further comprising determining whether a milking cluster is attached to the teats of the dairy livestock prior to extending the robotic arm.

7. A method for applying disinfectant to the teats of a dairy livestock, comprising:
   determining that a stall of a rotary milking platform having a substantially circular perimeter and housing a dairy livestock is located adjacent to a track that is positioned outside the perimeter of the rotary milking platform;
   moving a robotic arm along the track in relation to the rotary milking platform and independent of any physical coupling between the carriage and the rotary milking platform; and
   extending at least a portion of the robotic arm between the hind legs of the dairy livestock while the rotary milking platform rotates.

8. The method of claim 7, further comprising accessing a rotary encoder signal generated by a rotary encoder of the rotary milking platform, the rotary encoder signal based at least in part upon a rotational speed of the rotary milking platform.

9. The method of claim 8, wherein moving the robotic arm comprises moving the robotic arm along the track at a speed based at least in part upon the rotational speed of the rotary milking platform.

10. The method of claim 7, wherein the robotic arm comprises:
    an arm member operable to pivot about an axis that is parallel to the track; and
    a spray tool attached to one end of the arm member.

11. The method of claim 10, further comprising:
    pivoting the arm member about the axis; and
    rotating the spray tool about a point of attachment to the arm member.

12. The method of claim 10, wherein at least a portion of the robotic arm extends between the hind legs of the dairy livestock such the spray tool is located at a spay position from which it may discharge an amount of disinfectant to the teats of the dairy livestock.

13. The method of claim 10, further comprising applying disinfectant to the teats of the dairy livestock using the spray tool.

14. The method of claim 7, further comprising determining whether a milking cluster is attached to the teats of the dairy livestock prior to extending the robotic arm.

15. A method for applying disinfectant to the teats of a dairy livestock, comprising:
    accessing a rotary encoder signal generated by a rotary encoder of a rotary milking platform having a substantially circular perimeter, the rotary encoder signal based at least in part upon a rotational speed of the rotary milking platform, wherein the rotary milking platform comprises a stall housing a dairy livestock;
    determining that the stall of the rotary milking platform housing the dairy livestock is located adjacent to a track positioned outside the perimeter of the rotary milking platform;
    moving a robotic arm along the track in relation to the rotary milking platform and independent of any physical coupling between the robotic arm and the rotary milking platform, wherein the robotic arm moves at a speed based at least in part upon the rotational speed of the rotary milking platform; and
    extending the robotic arm between the hind legs of the dairy livestock.

16. The method of claim 15, wherein the robotic arm comprises:
    an arm member operable to pivot about an axis that is parallel to the track; and
    a spray tool attached to one end of the arm member.

17. The method of claim 16, further comprising:
    pivoting the arm member about the axis; and
    rotating the spray tool about a point of attachment to the arm member.

18. The method of claim 15, wherein at least a portion of the robotic arm extends between the hind legs of the dairy livestock such that the spray tool is located at a spay position from which the spray tool may discharge an amount of disinfectant to the teats of the dairy livestock.

19. The method of claim 16, further comprising applying disinfectant to the teats of the dairy livestock using the spray tool.

20. The method of claim 15, further comprising determining whether a milking cluster is attached to the teats of the dairy livestock prior to extending the robotic aim.

* * * * *